Aug. 22, 1961 F. T. THOMPSON 2,997,694

SYSTEM FOR UTILIZING INTELLIGENCE SIGNALS TO PERFORM CONTROL FUNCTIONS

Filed Jan. 7, 1958 2 Sheets-Sheet 1

WITNESSES:
John E. Healy, Jr.
James F. Young

INVENTOR
Francis T. Thompson
BY
Charles V. Renz
ATTORNEY

United States Patent Office 2,997,694
Patented Aug. 22, 1961

2,997,694
SYSTEM FOR UTILIZING INTELLIGENCE SIGNALS TO PERFORM CONTROL FUNCTIONS

Francis T. Thompson, Pittsburgh, Pa., assignor to Westinghouse Electric Corporation, East Pittsburgh, Pa., a corporation of Pennsylvania Filed Jan. 7, 1958, Ser. No. 707,630
10 Claims. (Cl. 340—173)

The invention relates generally to control systems and more particularly to control systems for utilizing intelligence signals for performing control functions.

The object of the invention is to provide for superimposing an impulse of predetermined amplitude and duration on an intelligence signal to utilize the intelligence signal for performing control functions.

It is also an object of the invention to provide for superimposing a voltage impulse on an intelligence signal to provide for establishing and maintaining a potential proportional to a selected instantaneous value of the intelligence signal to perform control functions and for eliminating any previous established potential.

Other objects of the invention will, in part, be obvious and will, in part, appear hereinafter.

The invention accordingly comprises the features of construction, combination of elements, and arrangement of parts, which will be exemplified in the construction hereinafter set forth, and the scope of the application of which will be indicated in the claims.

For a fuller understanding of the nature and objects of the invention, reference should be had to the following detailed description taken in connection with the accompanying drawing, in which.

Figures 1, 2, 3:
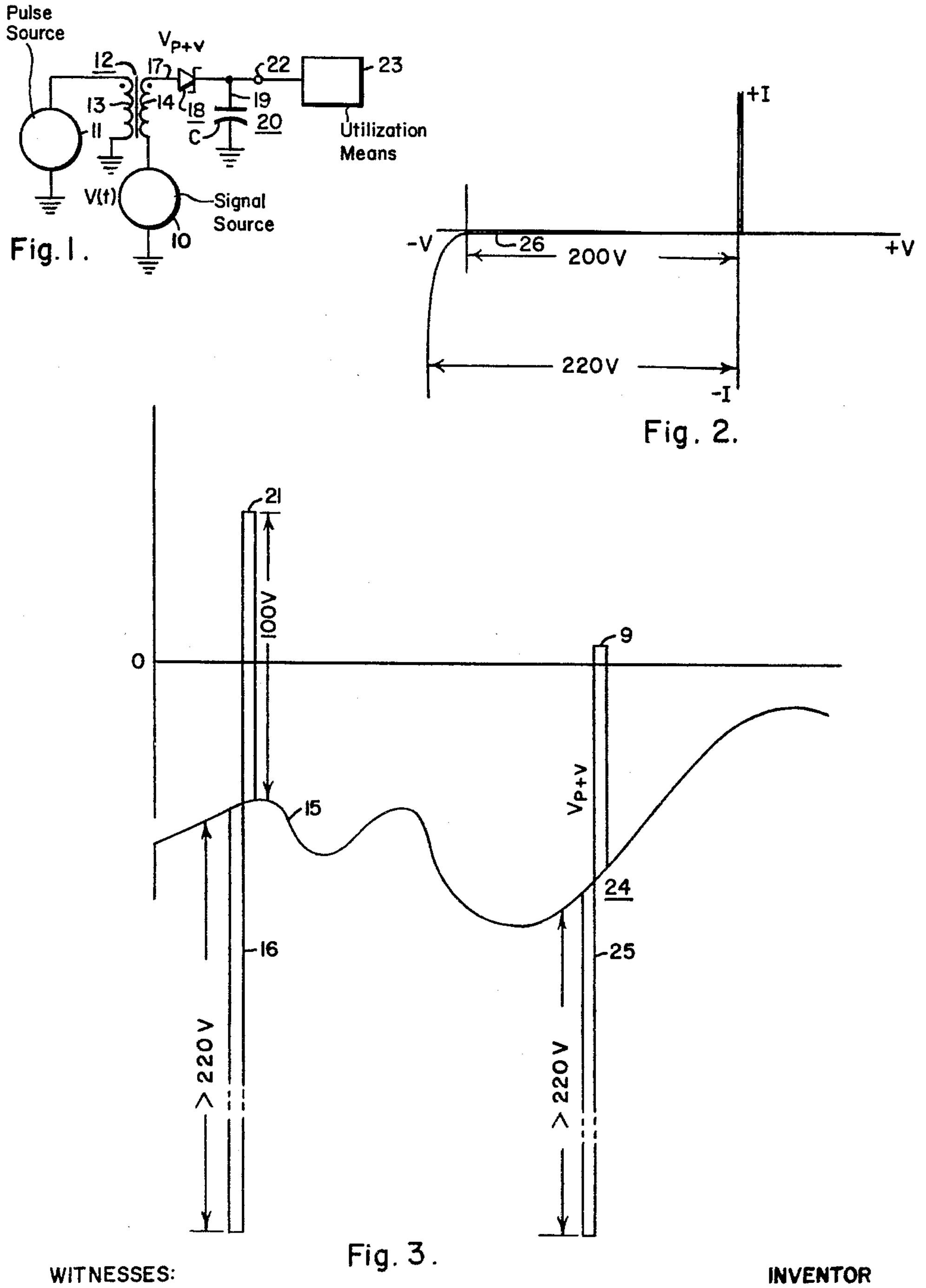
FIGURE 1 is a circuit diagram showing the features of the invention.
FIG. 2 is a characteristic curve for the diode utilized in the circuit system showing how it breaks down when subjected to predetermined voltages.
FIG. 3 is a diagram showing how a voltage impulse is imposed on an intelligence signal.

Referring now to the drawing and FIG. 1 in particular, the circuit system shown comprises a source of an intelligence signal 10 such as, for example, the video detector of a television receiver or a supervisory control system. Circuit systems for producing and transmitting intelligence signals are well-known in the art and need not be described in detail.

A generator 11 is shown connected to deliver voltage impulses. Generators for producing voltage impulses of any predetermined amplitude and duration may be designed in accordance with well-known practice and need not be shown or described.

In this particular modification of the invention inductively coupled windings, such for example, as provided in a transformer and shown generally at 12, are provided for receiving and mixing the voltage impulse and the intelligence signal. The transformer 12 is provided with two windings 13 and 14 which may have any predetermined ratio of turns. In the modification illustrated, the number of turns in the windings 13 and 14 are equal. The generator 11 is connected to winding 13, while the input signal system 10 is connected to the winding 14.

The function of the inductively coupled device or transformer is to mix the current impulse delivered by the generator 11 and the intelligence signal delivered through the circuit system 10. The dots shown in conjunction with the windings 13 and 14 indicate the ends of the windings that become positive at the same instant. The net result is that the voltage impulse delivered by the generator 11 is added to the input or intelligence signal.

For purposes of explanation we will assume that the voltage impulse delivered by the generator 11 is superimposed on the intelligence signal at a particular instant. This is illustrated in FIG. 3 by the graph or curve 16. The generator will be designed and connected to deliver an impulse, the first portion of which is negative and when added to the intelligence signal represented by the curve 15 results in a voltage having a large negative value which causes the diode 18 to breakdown and discharge capacitor 20 thereby eliminating all traces of a previous signal, and the second portion of which builds up to a positive voltage as represented by the upper portion 21 of curve 16. As the voltage impulse superimposed on the intelligence signal represented by the curve 15 is increased to a predetermined value, positive current will flow in the circuit. The circuit for the positive current flow may be traced from the inductive device 12 through conductor 17, a diode shown generally at 18, conductor 19, to the capacitor shown generally at 20.

The diode 18 is so connected in the circuit that unless subjected to breakdown voltage it passes current only in the forward direction to the capacitor 20. When the capacitor 20 is charged the diode 18 cooperates to maintain the charge. The charge stored in the capacitor 20 will depend on the amplitude of the positive impulse delivered by the generator 11 which is added to the intelligence signal delivered at the instant they are combined. Since the impulse delivered by the generator 11 is constant in amplitude the positive charges impressed on the capacitor 20 at different times will vary with the intelligence signal delivered by signal source 10. As shown in FIG. 3, the combined voltage impulse and intelligence signal represented by the curve 15 reaches the point 21 in the positive direction.

When the capacitor 20 is charged, it is available to deliver a current in the forward direction through the terminal 22 to any deivce that may be connected for the purpose of performing a control function. Any suitable device, such as a cathode follower 23, may be utilized for receiving a signal from the capacitor 20 and translating it for performing a control function. Cathode followers are well-known in the art and need not be described. For a disclosure of a cathode follower see page 5, Patent 2,294,863.

Assuming now that the next point at which it is desired to utilize the intelligence signal represented by the curve 15 for performing a useful control function is shown generally at 24. Prior to reaching the point 24 on the curve 15, the intelligence signal will continue to flow to the inductive coupling device 12. However, this intelligence signal is not of sufficient voltage value to forwardly bias diode 18, and therefore does not change the charge on the capacitor 20. When the next impulse is delivered, it will be applied at the point shown generally at 24 on the curve 15 where the signal voltage is illustrated as being lower than at the first point selected on curve 15 for the application of the impulse voltage represented by curve 16. Therefore, point 9 represents a lower positive value than point 21, the highest value reached by curve 16.

In designing the impulse generator provision will be made for delivering an impulse, the lower portion of which will reach a value of sufficient magnitude in the negative direction to effect a breakdown of, or the rendering of, the diode 18 highly conductive. When the diode 18 is rendered highly conductive by the negative portion of the current impulse, the capacitor 20 will be completely discharged, leaving no trace of the previous signal which charged it. The impulse will then build up to the combined value of the intelligence signal at point 24 plus the positive portion of the voltage impulse which will again charge the capacitor 20. The value of the charge imposed on the capacitor 20 in this instance will be smaller than the charge imposed on the capacitor by the voltage impulse represented by the curve 16. Therefore, when a generator 11 is provided, which impresses a voltage impulse of predetermined amplitude and duration on the intelligence signal, a charge will be impressed on the capacitor which corresponds to the intelligence signal at the particular points at which the impulse is combined with or added to the intelligence signal. Therefore, the capacitor is charged to deliver current for performing control functions which correspond to the signal delivered.

As has been pointed out the impulse generator may be designed to deliver an impulse of a predetermined amplitude and duration. In the embodiment described, the negative portion of the impulse precedes the positive portion to assure that all traces of a previous signal are eliminated before the capacitor 20 is again charged in accordance with the selected intelligence signal. The charge impressed on the storage capacitor 20 will have a voltage nearly equal to the instantaneous intelligence signal voltage plus the peak positive impulse voltage. Following the discontinuance or the end of the impulse, the diode is biased negatively, and because of its characteristics only a very negligible amount of leakage current flows. The voltage stored in the capacitor remains substantially constant and can be utilized to perform a control function through the cathode follower 23.

The diode shown generally at 18 will be selected depending on its characteristics and power rating. The curve 26 illustrated in FIG. 2 represents generally the characteristics a diode such as 18 should have to function properly in the circuit system. Many such diodes are available to the trade.

Reference to the curve 26 will reveal that the diode has a very low resistance to current flow in the forward direction. This is illustrated by the fact that the portion of the curve on the right side lies substantially along the ordinate. Further, there is substantially no leakage in the reverse direction through the diode as the voltage builds up in the negative direction. In the diode for which this curve was prepared, when the voltage increased to about 200 volts the diode became highly conductive or was subjected to a so-called breakdown process. At this point, as shown, the diode became highly conductive in the reverse direction and a heavy negative current flowed. When breakdown occurs the capacitor 20 is discharged through the diode.

In the functioning of the system disclosed in FIG. 1 from zero volts to approximately 200 volts in the negative direction, the charge on the capacitor 20 is maintained substantially constant. When the breakdown or the rendering of the diode 18 highly conductive occurs, a heavy current flows. The incremental resistance is low and current flow increases rapidly.

The circuit system described hereinbefore can be utilized to translate intelligence signals to perform control functions. The description of the functioning of the circuit system of FIG. 1 is for the instantaneous transmission of signal potentials of selected points in the curve representing the intelligence signal to perform control operations in accordance with such particular signal instant. When it is desired to utilize the circuit system for controlling a display or video screen, a large number of such circuits may be provided. In such manner it would be possible to approach the employment of the whole of the transmitted signal to energize the display screen or the video screen to establish an image conforming to the signal received. This circuit could be utilized for energizing display screens such as disclosed in copending patent application Serial No. 723,680, filed March 25, 1958, which is assigned to the same assignee as that of the present invention. It can also be utilized to actuate any number and type of elementary light source for producing a display in accordance with the intelligence signal.

Ordinarily, in circuit systems of this kind, a plurality of diodes are required for controlling a single circuit. It will be noted that in this particular circuit system only one diode is employed in conjunction with a storage capacitor. This greatly simplifies the circuit system and reduces the overall cost.

Certain types of silicon diodes have been found to be quite satisfactory in this circuit since they offer a reverse resistance of the order of $10^{10}$ ohms at moderate reverse voltages. Upon breakdown the resistance of the diode drops to about 2,000 ohms. The breakdown or the rendering of the diode highly conductive may occur at any given potential, depending on the rating of the diode in the reverse direction, and as the voltage increases above breakdown value, the resistance drops. The incremental resistance to increase in current expressed by $$R=\frac{\Delta V}{\Delta I}$$

is low.

In the example given in FIG. 3, the impulse delivered by the generator 11 had a range from positive to negative greater than 320 volts. The voltage applied above the curve 15 was about 100 volts, while the voltage below was greater than 220 volts.

Figure 4:
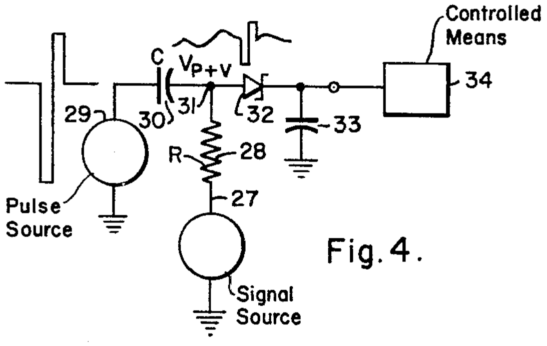
FIG. 4 is a circuit diagram showing a modification of the circuit system disclosed in FIG. 1.

Referring now to FIG. 4, the circuit system comprises a circuit 27 through which an intelligence signal is transmitted. In this particular embodiment of the invention a resistor 28 is connected in series circuit relationship in the circuit 27. An impulse generator 29 is provided for delivering impulses having a predetermined amplitude and duration.

A capacitor 30 is connected between the impulse generator and a junction 31 to which both the intelligence signal and the impulse are delivered. In this circuit there is no inductive mixing transformer such as employed in the circuit of FIG. 1. The use of the resistance-capacitance mixing circuit system shown in FIG. 4 depends on the rate of change of impulse amplitude being higher than the rate of change of the intelligence signal. The ohmic resistance of the resistor 28 and the capacitance of 30 are selected, depending on the impedance level and the rate of change of the intelligence signal and impulse potentials. The diode shown generally at 32 and the capacitor at 33 are substantially the same as the diode shown generally at 18 and the capacitor at 20, respectively, of FIG. 1. When the circuit is employed to perform a control function, the capacitor 33 may be connected to a cathode follower or utilization device 34.

In the functioning of this system when an impulse potential is delivered in conjunction with the intelligence signal, the two are first carried to a negative value to erase any previously stored charge on the capacitor. When the impulse builds up to the zero line, it may move horizontally a very short distance and then build up to the positive value required for charging the capacitor 30.

This circuit system functions to store a potential proportional to the value of the intelligence signal at the instant the charging impulse is applied. The discharge or erasing of the stored impulse at a later time is effected by the application of the erasing portion of the impulse of the next impulse delivered.

Figure 5:
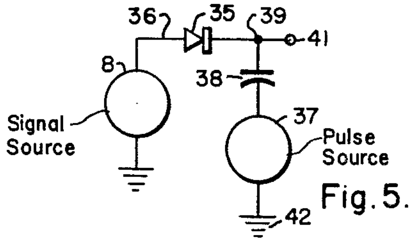
FIG. 5 is a modification of the circuit systems shown in FIGS. 1 and 4.

In the modification illustrated in FIG. 5, a diode shown generally at 35 is connected in circuit relationship with the source 8 provided for delivering the intelligence signal. An impulse generator 37 is connected in series circuit relationship with the capacitor 38 and to a junction point 39 common with the circuit through the diode or rectifier 35. An output circuit 41 is provided for connecting the system to a cathode follower or the like. The impulse generator is grounded at 42, as shown.

Figure 6:
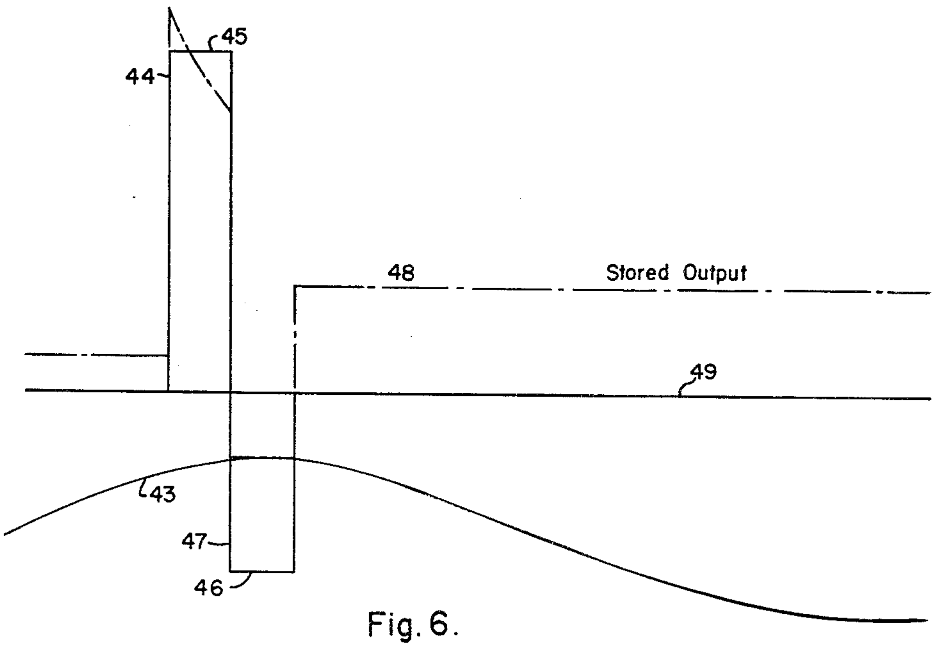
FIG. 6 is a diagram showing how a voltage impulse may be imposed on an intelligence signal in accordance with the circuit system of FIG. 5.

This circuit is simple and has great merit. One feature to be observed is that the polarity of the impulse voltages delivered by the generator 37 are reversed as shown in the diagram of FIG. 6.

In operation, when the impulse is received from the impulse generator 37, it is combined with the intelligence signal in the loop comprising intelligence signal source 8, diode 35, capacitor 38 and impulse generator 37, as shown in FIG. 5. The impulse 47 first builds up as shown at 44 reaching a maximum level at point 45 and later falling to a point below the zero line as shown at 49 in FIG. 6. The portion of the impulse represented by level 45 in the curve of FIG. 6 effects the discharge of the capacitor 38 by causing the diode 35 to breakdown. The portion of the impulse represented by the portion 47 of the curve below the zero line effects the charging of the capacitor 38. The capacitor 38 is charged to the potential difference between the intelligence signal and the minimum level of the impulse at point 46. The potentials which appear at terminal 41 in the circuit system of FIG. 5 is represented by the dot-dash curve 48 in FIG. 6.

Since certain changes may be made in the above construction and different embodiments of the invention could be made without departing from the scope thereof, it is intended that all matter contained in the above description or shown in the accompanying drawing shall be interpreted as illustrative and not in a limiting sense.

I claim as my invention:

1. In a circuit system for utilizing intelligence signal for performing control functions, storage means for storing a charge representative of a portion of said signal, a single asymmetrically conductive device having the property of becoming highly conductive in response to inverse voltages exceeding a predetermined amplitude, said device being connected in series with said storage means, a source of intelligence signal, a source of alternately positive and negative voltage pulses with the negative pulses exceeding said predetermined amplitude, and circuit means connected to said sources for additively combining said intelligence signals and said voltage pulses and connected to the series combination of said storage means and said device for applying said pulses and signals in additive combination across said storage means and said asymmetrically conductive device so that said positive voltage pulses are applied to said device to render the same forwardly conductive during one time interval and the negative voltage pulses are applied to render the same inversely conductive during another time interval to permit discharging and recharging of said storage means during different ones of said time intervals.

2. A system for charging and discharging a capacitor in accordance with the amplitude of a signal at selected time intervals comprising, a single asymmetrically conductive switching rectifier having the properties of forward conductivity in response to application of voltages of a first polarity thereto and breakdown inverse conductivity in response to application thereto of voltages of a second polarity exceeding a predetermined amplitude level, said rectifier and said capacitor being serially connected between a pair of input terminals, a source of information bearing signal, circuit means connected to said signal source for applying said signal across said input terminals, a source of recurrent voltage pulses, circuit means connected to said source of pulses for applying pulses of alternate polarity between said input terminals at selected times and additively with said information bearing signal, said rectifier normally blocking said capacitor against charge in response to said signal, and said voltage pulses being coupled to said rectifier in a manner such that said rectifier is rendered forwardly conductive by the voltage pulses having said first polarity whereby said capacitor is charged in accordance with the amplitude of said signal and said rectifier is rendered inversely conductive by the voltage pulses having said second polarity to discharge said capacitor through said rectifier.

3. In an intelligence signal storage system, charge storage means for storing charges representative of instantaneous values of said intelligence signal; a single asymmetrically conductive rectifier device connected in series with said charge storage means between a pair of input terminals, said rectifier device exhibiting high inverse resistance when subjected to inverse voltages within a predetermined voltage range and relatively low incremental resistance when subjected to inverse voltages exceeding said voltage range; a source of intelligence signal; a source of time-spaced switching voltage pulses having first and second polarities, with the pulses of said second polarity having voltage amplitudes exceeding said predetermined voltage range; circuit means coupling said signal source and said input terminals for applying said intelligence signal across the series combination of said rectifier device and said storage means in a manner such that said rectifier device normally blocks the passage of said intelligence signal to said storage means; and circuit means coupling said source of voltage pulses and said input terminals for applying said voltage pulses across said series combination in a manner such that said voltage pulses of said first polarity render said rectifier device forwardly conductive during first selected time intervals to permit charging of said storage means therethrough, and said voltage pulses of said second polarity render said rectifier inversely conductive during other selected time intervals to discharge said storage means therethrough.

4. In a circuit system for utilizing intelligence signal to perform control functions, storage means for storing a charge representative of a portion of said signal, a single asymmetrically conductive diode having the property of becoming highly conductive in response to inverse voltages exceeding a predetermined amplitude, said diode being connected in series with said storage means; a source of intelligence signal; a source of voltage pulses having first and second polarities, with the pulses of said second polarity having amplitudes exceeding said predetermined amplitude; and inductive means including a first winding portion connected to said sourse of signal and a second winding portion connected in series with said source of pulses for additively combining said intelligence signal and said voltage pulses, said second winding portion and said source of pulses being connected in series to the series combination of said storage means and said diode for applying said pulses and signal in additive combination to said storage means and said diode so that said voltage pulses of said first polarity are applied to said diode to render the same forwardly conductive during one time interval and said voltage pulses of said second polarity are applied to said diode to render the same inversely conductive during another time interval to permit discharging and recharging of said storage means during different ones of said time intervals.

5. In an intelligence signal storage system, charge storage means for storing charges representative of instantaneous values of said intelligence signal; a single asymmetrically conductive rectifier device connected in series with said charge storage means between a pair of input terminals, said rectifier device exhibiting high inverse resistance when subjected to inverse voltages within a predetermined voltage range and relatively low incremental resistance when subjected to inverse voltages exceeding said voltage range; a source of intelligence signal; a source of time-spaced switching voltage pulses having first and second polarities, with the pulses of said second polarity having voltage amplitudes exceeding said predetermined voltage range; inductive means connected to said signal source and said source of voltage pulses for additively combining said intelligence signal with said voltage pulses; circuit means connected between said inductive means and at least one of said input terminals for applying said intelligence signal across the series combination of said rectifier device and said storage means in a manner such that said rectifier device normally blocks the passage of said intelligence signal to said storage means; and circuit means coupling said source of voltage pulses and said input terminals for applying said voltage pulses across said series combination in a manner such that voltage pulses of said first polarity render said rectifier device forwardly conductive during first selected time intervals to permit charging of said storage means therethrough, and voltage pulses of said second polarity render said rectifier device inversely conductive during other selected time intervals to discharge said storage means therethrough.

6. In a circuit system for utilizing intelligence signal to perform control functions, storage means for storing a charge representative of a portion of said signal, a single asymmetrically conductive device having the property of becoming highly conductive in response to inverse voltages exceeding a predetermined amplitude, said device being connected in series with said storage means, a source of intelligence signal, a source of voltage pulses having first and second polarities, with the pulses of said second polarity having amplitudes exceeding said predetermined amplitude; first circuit means connected to said source of intelligence signal for applying said signal across the series combination of said storage device and said asymmetrically conductive device, second circuit means connected to said source of voltage pulses and connected in parallel with said first circuit means for applying said voltage pulses across said series combination in a manner such that said voltage pulses are additively combined with said intelligence signal to render said asymmetrically conductive device forwardly conductive during one time interval and inversely conductive during another time interval whereby discharging and recharging of said storage means is accomplished during different ones of said time intervals.

7. In an intelligence signal storage system, charge storage means for storing charges representative of instantaneous values of said intelligence signal; a single asymmetrically conductive rectifier device connected serially with said charge storage means between a pair of input terminals, said rectifier device being characterized by exhibition of high inverse resistance when subjected to inverse voltages within a predetermined voltage range and relatively low incremental resistance when subjected to inverse voltages exceeding said voltage range; a source of intelligence signal; a source of time-spaced switching voltage pulses having first and second polarities, with the pulses of said second polarity having voltage amplitudes exceeding said predetermined voltage range; first circuit means coupling said signal source and said input terminals for applying said intelligence signal across the series combination of said rectifier device and said storage means in a manner such that said rectifier device normally blocks the passage of said intelligence signal to said storage means; and second circuit means connected to said source of voltage pulses and to said input terminals in parallel with said first circuit means for applying said voltage pulses across the series combination of said storage means and said rectifier device in additive combination with said intelligence signal to render said rectifier device forwardly conductive during voltage pulses of said first polarity and inversely conductive during voltage pulses of said second polarity whereby discharging and recharging of said storage means is accomplished respectively during voltage pulses of said second and first polarities.

8. In a circuit system for utilizing intelligence signal for performing control functions, storage means for storing a charge representative of a portion of said signal, a single asymmetrically conductive device having the property of becoming highly conductive in response to inverse voltages exceeding a predetermined amplitude, said device being connected in series with said storage means, a source of intelligence signal, a source of voltage pulses having first and second polarities, with the pulses of said second polarity having amplitudes exceeding said predetermined amplitude, and circuit means coupling said source of pulses in series with said source of signal to the series combination of said storage means and said asymmetrically conductive device for additively applying said signal and voltage pulses to said series combination so that said voltage pulses of said first polarity render said device forwardly conductive during first time intervals and said voltage pulses of said second polarity render said device inversely conductive during other time intervals whereby charges representative of instantaneous value of said intelligence signal are retained by said storage means during time periods between said first time intervals and said other time intervals.

9. In an intelligence signal storage system, charge storage means for storing charges representative of instantaneous values of said intelligence signal; a single asymmetrically conductive rectifier device connected serially with said charge storage means between a pair of input terminals, said rectifier device being of the type characterized by exhibition of high inverse resistance when subjected to inverse voltages within a predetermined voltage range and relatively low incremental resistance when subjected to inverse voltages exceeding said voltage range; a source of intelligence signal; a source of time-spaced switching voltage pulses having first and second polarities, with the pulses of said second polarity having voltage amplitudes exceeding said predetermined voltage range; circuit means coupling said signal source and said input terminals for applying said intelligence signal across the series combination of said rectifier device and said storage means in a manner such that said rectifier device normally blocks the passage of said intelligence signal to said storage means; and circuit means connecting said source of voltage pulses in series with said source of intelligence signal for applying said voltage pulses additively with said intelligence signal across said series combination in a manner such that said voltage pulses of said first polarity render said rectifier device forwardly conductive during first selected time intervals to permit charging of said storage means therethrough, and said voltage pulses of said second polarity render said rectifier inversely conductive during other selected time intervals to discharge said storage means therethrough, whereby charges representative of the value of said intelligence signal during said first time intervals are stored by said storage means during the time periods between said first time intervals and said other time intervals.

10. In an intelligence signal storage system, charge storage means for storing charges representative of instantaneous values of said intelligence signal; a single asymmetrically conductive rectifier device connected in series with said charge storage means between a pair of input terminals, said rectifier device being of the type characterized by exhibition of high inverse resistance when subjected to inverse voltages within a predetermined voltage range and relatively low incremental resistance when subjected to inverse voltages exceeding said voltage range; a source of intelligence signal; a source of time-spaced switching voltage pulses having first and second polarities, with the pulses of said secondary polarity having voltage amplitudes exceeding said predetermined voltage range; inductive means including a first winding portion coupled to said source of signal and a second winding portion coupled, in series with said source of voltage pulses, to said input terminals for additively combining said intelligence signal and said voltage pulses, and for applying said combined pulses and signal across the series combination of said rectifier device and said storage means in a manner such that said rectifier device normally blocks the passage of said intelligence signal to said storage means and such that said voltage pulses of said first polarity render said rectifier device forwardly conductive during first selected time intervals to permit charging of said storage means therethrough, and said voltage pulses of said second polarity render said rectifier inversely conductive during other selected time intervals to discharge said storage means therethrough.

References Cited in the file of this patent

UNITED STATES PATENTS

| | | |
|---|---|---|
| 2,532,338 | Schlesinger | Dec. 5, 1950 |
| 2,565,497 | Harling | Aug. 28, 1951 |
| 2,666,816 | Hunter | Jan. 19, 1954 |
| 2,737,601 | McMahon | Mar. 6, 1956 |
| 2,760,160 | Flood et al. | Aug. 21, 1956 |
| 2,823,321 | Sims | Feb. 11, 1958 |

FOREIGN PATENTS

| | | |
|---|---|---|
| 160,213 | Australia | Nov. 5, 1953 |